Aug. 25, 1959  R. SCHWARZ ET AL  2,901,449
ORGANOSILICON CONDENSATION PRODUCTS
AND PROCESSES FOR PRODUCING THEM
Filed July 1, 1954

United States Patent Office 2,901,449
Patented Aug. 25, 1959

2,901,449

ORGANOSILICON CONDENSATION PRODUCTS AND PROCESSES FOR PRODUCING THEM

Robert Schwarz and Wilhelm Kuchen, Aachen, and Fritz Weigel, Schwabach, Germany, assignors to Siemens-Schuckertwerke, Aktiengesellschaft, Berlin-Siemensstadt, Germany, a corporation of Germany Application July 1, 1954, Serial No. 440,816

Claims priority, application Germany July 6, 1950

3 Claims. (Cl. 260—18)

This invention relates to novel organosilicon condensation products, processes for producing them and their application, particularly as heat-resistant electrically insulating materials.

The present application is a continuation-in-part of our copending patent application Serial No. 229,024, filed May 31, 1951, now abandoned.

It has been proposed heretofore to condense aliphatic orthosilicic or polysilicic acid esters with organic compounds containing hydroxyl groups. Because of the ease of cleavage of all of the alkyl groups attached to silicon in the aliphatic esters of silicic acid with the formation of free alcohols and the like, a high degree of cross-linking results even if only a small amount of the silicic acid ester is employed in these known reactions.

The products produced from aliphatic silicic acid esters and the hydroxy compounds are highly cross-linked resinous materials which when applied to surfaces as coatings, for example, exhibit poor heat endurance. When subjected to heat, coatings of such resinous materials degrade rapidly. They become quite brittle in short periods of time at moderate temperatures, tending to crack and fissure badly, and their physical properties deteriorate markedly. The electrical insulating properties of these highly cross-linked condensation products are also degraded and lost rapidly when they are subjected to heating.

We have discovered that condensation products of certain polyhydroxy compounds and aromatic ortho- and polysilicic acid esters, in certain proportions, produce resinous products that exhibit an unusual degree of thermal endurance, approaching that of the organopolysiloxanes.

The object of the invention is to provide a process for reacting aromatic ortho- and polysilicic acid esters with polyhydroxy compounds in certain selected proportions to produce heat-resistant condensation products.

Another object of the invention is to provide for reacting both polyisocyanates and aromatic esters of silicic acid with polyhydroxy compounds in certain selected proportions to produce heat-resistant condensation products.

A still further object is to provide novel organosilicon condensation products from aromatic silicic acid esters, and to prepare electrically insulated members therefrom.

Other objects and features of the invention will be apparent from the following detailed description and drawing, wherein—

Figure 1:
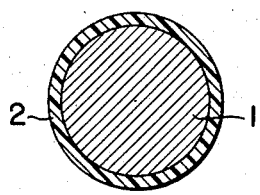
Fig. 1 is a cross-sectional view of a conductor coated with the condensation product of the invention.

We have discovered that highly heat-resistant resinous condensation products may be produced by condensing an aromatic silicate with a polyhydroxy compound in proportions providing at least 0.1 mole and not over 0.9 mole of the aromatic silicate per mole of hydroxyl group in the polyhydric alcohol. The resulting condensation product must contain a substantial amount of unreacted hydroxyl groups. The resinous condensation products may be employed as varnishes or coating materials for cloth, wire, metal and numerous other purposes. Such coatings will not peel, crack or fissure when heated to temperatures at which aliphatic silicate-polyhydric alcohol condensation products will fail. The resinous condensation products may be employed as molding powders and for laminating purposes.

Furthermore, a part of the hydroxyl groups of the polyhydric alcohol may be reacted with polyisocyanates and the remainder, at least 0.1 mole of hydroxyl group, with the aromatic silicate.

The polyisocyanate may be reacted with the polyhydroxy compound either before or concurrently with the aromatic silicate. For example, 3 moles of castor oil (2796 grams) are heated with 2 moles of tolylene di-isocyanate (348 grams) for four hours and the reaction product may then be reacted with an aromatic silicate. The proportions of the polyhydroxy compound to the polyisocyanate may vary from a few mole percent to as much as 100 mole percent in case of trihydric alcohols such as glycerol and castor oil. With larger proportions of a di-isocyanate there may be required a large amount of a strong organic solvent to produce solutions of varnish of low viscosity.

Suitable polyisocyanates are ethylene di-isocyanate, hexamethylene di-isocyanate, propylene-1,2-di-isocyanate, 1,2,4-benzene tri-isocyanate, metaphenylene di-isocyanate, xylylene di-isocyanate, the corresponding dithiocyanates, and mixtures of two or more.

For the purpose of this invention, the polyhydroxy compound may be an aliphatic alcohol such as glycerine, ethylene glycol, and penta-erythritol, or mixtures of two or more; or hydroxy esters of fatty acids and dicarboxylic acids, such as castor oil, monoricinoleic ester of glycerine and butylene glycol-glycerine-adipic acid mixed esters, and mixtures of two or more; or partial methylol condensation products such as methylol melamine, methylol urea and methylol phenols; or incompletely acetalized polyvinyl alcohol; or mixtures of any two or more.

Various known aromatic ortho- and polysilicic acid esters may be employed in our processes. Examples are tetraphenylsilicate, orthophenyl di-silicate, orthocresyl trisilicate and oxydiphenyl orthosilicate, and mixtures of two or more.

We have found that fully esterified aromatic silicates react in such a manner with polyhydroxy compounds that only one aroxy group readily reacts with a hydroxy group and is split off as an aromatic alcohol, an interester being produced by coupling at the position of the hydroxy group in the polyhydroxy compound. Because of both steric hindrance and the great amount of energy required to cleave additional aroxy groups, further interesterification between other hydroxy groups in the polyhydroxy compound and the coupled aromatic silicate may include, at most, a second aroxy group, after exposure to higher temperatures, of the order of temperatures applied during ordinary heat-curing. Consequently, this second aroxy group, producing cross-linkages, can be used to transform into a heat-hardened state such materials that, like polyvinyl formate, are ordinarily not heat-hardenable. Our investigations indicate that initial resinous condensation products of this disclosure comprise almost entirely a single bond resulting from the reaction between one hydroxy group and a single aroxy group of the aromatic silicate. Consequently, the condensation products are highly stable.

The condensation reaction between the aromatic silicate and the polyhydroxy compound is carried out by admixing the ingredients and heating to a temperature, under atmospheric pressure or vacuum, sufficient to remove the aromatic alcohol evolved. Vacuum may be applied to the reaction vessel to remove the alcohol and thereby enable the condensation to be carried out expeditiously. A reflux condenser may be employed, particularly if a volatile solvent is present, the solvent and aromatic alcohol being recovered by subsequent distillation and condensation after the reaction has proceeded to the point where the reactants no longer separate in the reaction kettle. Reaction temperatures of from 80° to 170° C. are adequate, though they may be varied from these values. In some instances, the reactants, particularly if isocyanates are present, heat up spontaneously on being admixed to a temperature where reaction will be completed in a period of an hour or less. We have carried out the reaction for eight to twenty-four hours by heating at 100° C.

The resinous condensation products may be dissolved in volatile solvents such as cyclohexanol, butanol, cyclohexanone, amyl acetate, ethylene glycol, xylene, and benzene, or mixtures of two or more, and employed as varnishes, and coating and impregnating insulating compositions. The applied varnish compositions are heated to remove the solvent and to cure the resinous condensation products into hard films and coatings. Several hours at 140° C. to 200° C. is usually adequate to effect such curing; however, lesser or greater temperatures with proportionate changes in the drying times may be employed.

The following examples illustrate the practice of the present invention.

Example 1

In a reaction vessel, 600 grams of castor oil were reacted with 400 of cresyl orthosilicate at 100° C. for several hours. The proportions provided approximately 2 moles of hydroxyl groups per mole of the cresyl orthosilicate. The cresol evolved was withdrawn and a homogeneous reaction product resulted. At 25° C., the reaction product was of low enough viscosity that it could be used as a varnish without any solvent. Test surfaces coated with the resinous composition were baked two hours at 200° C. and hard coatings were produced. The baked coatings had great stability at elevated temperatures and did not craze, crack or peel.

Example 2

Into a reaction vessel, there were introduced 93 parts by weight of castor oil, 40 parts by weight of cresyl orthosilicate, and 17 parts by weight of tolylene di-isocyanate, the reaction involving approximately 3 moles of hydroxyl groups, 1 mole of the di-isocyanate and 1 mole of the cresyl silicate. The mixture heated itself to a temperature of about 40° C., causing polymerization of the castor oil. The remaining hydroxy groups react with the silicic acid ester during subsequent baking of the varnish. On cooling, a homogeneous resinous reaction product was secured. Coatings of the reaction product on surfaces were heated slowly to 200° C. and maintained at this temperature for two hours. The cured coatings showed not only great thermal endurance, but a high resistance to hydrolysis by water and alkalies.

Example 3

A mixture of 372 parts by weight of the monoricinoleic acid ester of glycerine and 1500 parts by weight of ortho-oxydiphenyl orthosilicate (about 1.5 mole of hydroxyl groups being present per mole of the orthosilicate) was reacted as in Example 1, and the resulting resinous condensation product was dissolved in 400 parts by weight of xylol. Coatings of this composition were heated for four hours at 200° C. Cured films having good physical properties resulted.

Example 4

In a reaction vessel, 54 parts of monoricinoleic acid ester of glycerine, 40 parts of cresyl orthosilicate and 17 parts of tolylene di-isocyanate were admixed. The reaction proceeded as in Example 2. Coatings of the resulting resinous product were baked at 200° C. for two hours and the cured coatings were characterized by high thermal endurance and great resistance to hydrolysis.

Example 5

A hydroxy polyester was prepared by reacting 2 moles of phthalic acid and 3 moles of hexanetriol. Into a reaction kettle were introduced 770 parts of this hydroxy polyester dissolved in 800 parts of amyl acetate, and 200 parts of phenyl orthosilicate. The mixture was heated to 100° C. for two hours under a reflux cooler, whereby a condensation took place between the polyester and the silicic acid ester. The resulting phenol remained dissolved in the amyl acetate and was removed during the subsequent baking together with the said solvent. Test surfaces coated with the reaction product were baked for eight hours at 140° C. to evaporate the solvent and cure the applied resinous condensate. The cured films were quite hard and withstood elevated temperatures quite well.

Example 6

A hydroxy polyester was prepared by reacting 37 parts by weight of phthalic acid, 45 parts of ricinoleic acid and 18 parts of glycerine. This polyester was dissolved in an equal part by weight of xylol, and 1200 parts of the solution were admixed with 800 parts of a 50% solution of oxydiphenyl orthosilicate in xylol. The mixture was heated until no separation occurs. The resinous condensate when baked at 150° C. for eight hours was of great thermal endurance.

Example 7

A 50% solution in xylol was prepared from the phthalic-ricinoleic-glycerine ester of Example 6, and 1200 parts by weight of this solution were admixed with 70 parts by weight of tolylene di-isocyanate and 800 parts by weight of a 50% xylol solution of oxydiphenyl silicate. The reaction was carried out as in Example 5, coatings of the resulting condensation product being heated at 80° C. for an hour preceding curing for eight hours at 140° C. Hard films having great thermal stability resulted.

Example 8

A polyester with hydroxyl groups was initially prepared by reacting 3 gram moles of adipic acid, 2 gram moles of butylene glycol and 2 gram moles of glycerine. 500 grams of this polyester (a) were admixed with 100 grams of the reaction product of 1 mole hexanetriol and 3 moles tolylene di-isocyanate, the remaining isocyanate groups of which had been stabilized by phenol (b), and 400 grams of oxydiphenyl silicate (c); the mixture was dissolved in 1000 grams of ethylglycol and heated to 120° C. for one hour. The resulting varnish was coated on test surfaces and cured at 160° C. for four hours, a very stable, hard varnish coating being produced. The cured coatings had high thermal stability and resistance to hydrolysis.

Example 9

400 grams oxydiphenyl silicate (a), 300 grams of dimethylol urea etherified and plasticized with 5% by weight of adipic acid-glycol polyester (*b*), and 300 grams of solvent soluble, partially reacted p-tert-butyl phenol and formaldehyde (1 mole of the phenol per 1.5 mole of formaldehyde) (*c*) were dissolved in 500 grams butanol and heated for three hours to the boiling point of butanol. After vacuum-evaporating the solvent and the resulting oxydiphenyl, the reaction mixture was dissolved in 1000 grams of equal parts cyclohexanol and mineral spirits. Coatings of the reaction product were applied to test surfaces and cured as in Example 8. The cured coatings were hard and exhibited high thermal stability.

*Example 10*

The following were reacted as in Example 9: (*a*) 400 grams of oxydiphenyl orthosilicate, (*b*) 300 grams of a methylol melamine reaction product, and (*c*) 300 grams of the p-tert-butyl phenol-formaldehyde reaction product as in Example 9, the reaction product being dissolved in 1000 grams of a mixture of cyclohexanol and butanol. This composition was applied to members as in Example 8, with the cured coatings showing high thermal endurance.

*Example 11*

A hydroxy ester was prepared by heating, at temperatures above 100° C. for several hours, a mixture of 3 moles of adipic acid, 2 moles of butylene glycol and 2 moles of glycerine. 64 grams of the resulting hydroxy ester was admixed with 100 grams of tetraphenyl orthosilicate and the mixture was heated at 100° C. for over twenty-four hours, alcohol and ether by-products being removed continually, there being no separation upon cooling to room temperature. Various organic solvents may be employed to dissolve the resinous condensates, thereby producing varnishes which, when cured, have a high thermal endurance.

*Example 12*

A mixture of 600 grams of polyvinyl formate (8% hydroxy groups, 0.3 mole silicate per hole of hydroxyl) and 400 grams of cresyl orthosilicate dissolved in 4000 grams of cyclohexanone were heated for two hours to a temperature of 80° C.. At the end of this period, the reaction was finished and the resulting varnish ready for use. The varnish was found suitable for coating copper wire, and upon curing such enameled wire was found to have high heat endurance.

*Example 13*

A polyester with hydroxy groups was prepared by reacting 77 parts by weight of a glycerol-phthalate ester having a substantial excess of glycerol over that required to react with the carboxyl groups of phthalic acid, and 23 parts by weight of Vorlauf fatty acids derived by oxidizing paraffin by the Fischer-Tropsch method. In a reaction vessel were admixed 300 grams of the hydroxyl polyester, 400 grams of oxydiphenyl silicate and 300 grams of p-tert-butyl-phenol-formaldehyde partial reaction product of Example 9. There were present between 0.3 and 0.4 mole of silicate per mole of hydroxy. The mixture was heated above 120° C. for an hour, the product being dissolved in 1000 grams of benzene. The resulting varnish was applied and cured as in Example 8, with the product showing high thermal endurance and resistance to hydrolysis.

*Example 14*

In a reaction vessel were admixed (*a*) 200 grams of an 80% solution of dimethyl urea in butanol according to Example 9 and (*b*) 400 grams of a cresyl-oxydiphenyl orthosilicate inter-ester, the reaction being carried out at 120° C. until no separation occurred on cooling to room temperature. The product was dissolved in 1000 grams of cyclohexanol and applied as a coating and cured as in Example 1. A hard coating of resin-resisting thermal decomposition at elevated temperatures resulted.

*Example 15*

In a reaction vessel was admixed (*a*) 400 grams of oxydiphenyl orthosilicate, (*b*) 500 grams of the polyvinyl formate having 8% residual hydroxy groups, and (*c*) 100 grams of th phenolic resin of Example 9 dissolved in 4000 grams of cyclohexanone and reacted as in Example 13. The resulting enameled wire had excellent thermal stability and was found to be particularly suitable as isolating material for bare wire.

*Example 16*

An alkyd resin was prepared by reacting at 160° C. to 180° C. (*a*) 45 parts by weight of the reaction product of equal parts by weight of styrene and dehydrated castor oil, (*b*) 37 parts by weight of phthalic acid, and (*c*) 18 parts by weight of glycerine. In a reaction vessel were admixed 600 grams of this hydroxy-containing alkyd resin and 300 grams of phenyl orthosilicate. These proportions provided 0.2 mole of the orthosilicate per mole of hydroxy groups in the alkyd resin. After reacting several hours at 140° C., the reaction product was dissolved in 1000 grams of xylol. Surfaces treated with the resulting varnish were cured for the times and temperatures of Example 5. The resulting cured coatings had a high thermal endurance.

Solutions of the resinous condensation products of this invention may be employed as coating and impregnating compositions for wire, coils and other electrical members, and for impregnating wrapping of glass cloth and asbestos cloth and the like applied to electrical conductors. If desired, fillers such as powdered silica, mica, graphite, iron oxide, asbestos fibers and the like may be incorporated in the compositions. Also, other compatible resins, such as siloxanes and alkyds, may be admixed with the resinous condensation products.

Referring to Fig. 1, there is illustrated an electrical conductor 1, for example, a copper wire, whose surface is coated with the cured resinous condensation product of Examples 1, 11, 12 and 15, for instance. It will be understood that the conductor 1 may be of any suitable cross-sectional shape other than circular, and may be of any suitable metal such as silver, iron, brass and the like.

Figure 2:
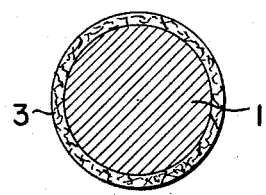
Fig. 2 is a cross-sectional view of a conductor wrapped with glass fibers which have been coated or impregnated with the condensation product of this invention.

In Fig. 2, the metallic conductor 1 is wrapped with glass fibers, and the fiber wrapping is impregnated with the resinous condensation product of the invention. After baking, there results a hard durable insulating layer 3 comprising the glass fibers and resin.

Figure 3:
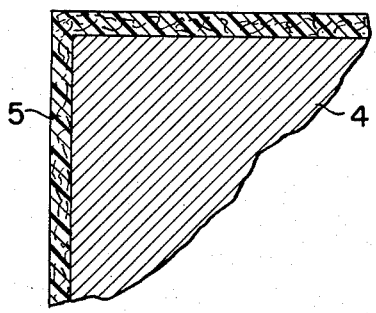
Fig. 3 is a fragmentary cross-sectional view of a member coated with the condensation product of the invention.

Referring to Fig. 3, the body 4 has applied thereto a casting 5 of the composition of this invention with finely divided solid filler dispersed therein.

Figure 4:
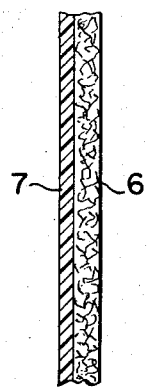
Fig. 4 is a fragmentary cross-sectional view of a sheet of glass fibers with the composition of the invention applied thereto.

Referring to Fig. 4, there is illustrated a sheet material comprising a body 6 of glass fibers impregnated with the resinous condensate, and, after curing of the impregnant, a further surface coating 7 of the resinous condensate is applied to one surface and baked thereon.

Figure 5:
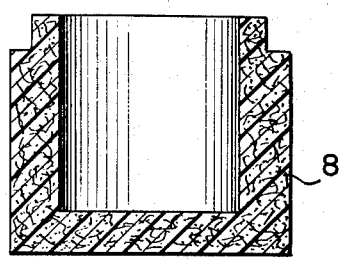
Fig. 5 is a cross-sectional view through a body of solid or fibrous material treated with the condensation product of the invention.

Molded members, such as 8 in Fig. 5, may be prepared by heating in a mold a mixture of the resinous condensate with a large amount of powdered or fibrous filler, or both, and heated until the composition cures.

It will be understood that the above examples are illustrative and not limiting.

We claim:

1. The method of producing heat-hardenable resinous products, comprising heating an admixture of an aromatic silicic acid ester and at least one aliphatic polyhydroxy compound, an isocyanate taken from the group consisting of alkylene and arylene polyisocyanates being added to the said admixture to react with the said polyhydroxy compound, the polyisocyanate addition being in an amount to leave at least 0.1 mole of hydroxyl groups per mole of aromatic silicate, there being a ratio of 0.1 to about 0.33 mole of the aromatic silicic acid ester per mole of hydroxyl groups in the polyhydroxy compound and a maximum total mole ratio of the silicic acid ester and polyisocyanate of about 0.66 per mole of the hydroxyl groups in said polyhydroxy compound, continuing the heating until separation of the components upon cooling substantially ceases, and separating liberated aromatic alcohol from the reaction product comprising a substantial ratio of free hydroxyl groups.

2. The method of claim 1, the polyhydroxy compound comprising castor oil.

3. The method of claim 1, the polyhydroxy compound comprising a ricinoleic acid ester of glycerine.

References Cited in the file of this patent

UNITED STATES PATENTS 2,048,799     Lawson _____ July 28, 1936

FOREIGN PATENTS 923,420     France _____ July 7, 1947